UNITED STATES PATENT OFFICE.

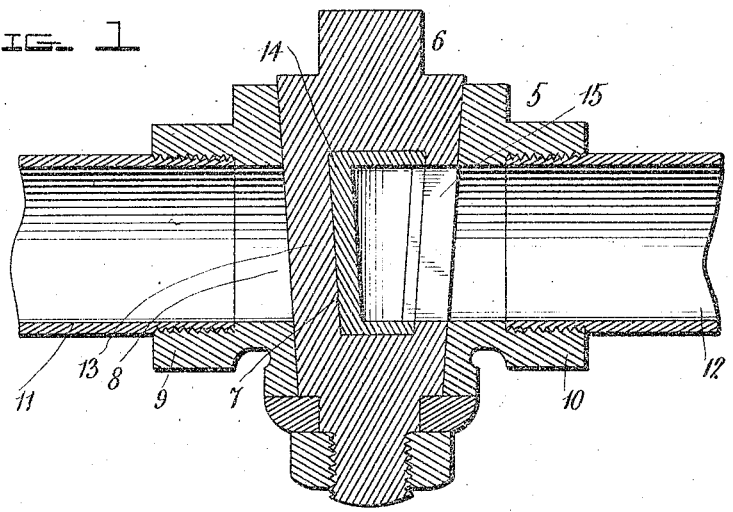
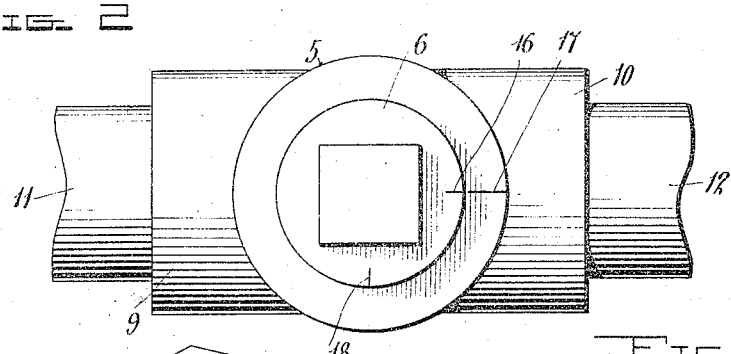
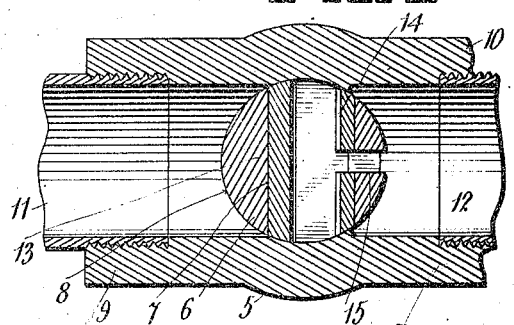
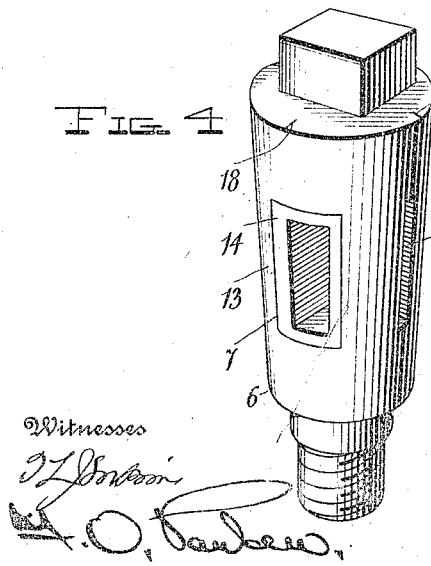

HAROLD P. F. HEDGER, OF WASECA, SASKATCHEWAN, CANADA.

STOP-COCK.

1,028,459.  Specification of Letters Patent.  Patented June 4, 1912.

Application filed May 18, 1910. Serial No. 562,104.

*To all whom it may concern:*

Be it known that I, HAROLD P. F. HEDGER, a subject of the King of Great Britain, residing at Waseca, in the Province of Saskatchewan, Dominion of Canada, have invented certain new and useful Improvements in Stop-Cocks; and I do hereby declare the following to be a full, clear, and exact description of the invention, such as will enable others skilled in the art to which it appertains to make and use the same.

The invention relates to stop cocks and more particularly to the class of valves for stop cocks.

The primary object of the invention is the provision of a stop cock in which the turning plug thereof is provided with a drain passage so that water may be drained from the plug core thus preventing the bursting thereof should the contents of the pipe become frozen during cold weather.

Another object of the invention is the provision of a stop cock in which the water passage through the turning plug thereof is lined or coated with an inoxidizable substance to prevent injury to the cock by saline or other injurious solutions passing through the cock.

A further object of the invention is the provision of a stop cock in which the turning plug thereof is provided with a passage way the same being disposed slightly to one side of its axis of rotation so that the plug when in closed position will present a thickened wall toward the bore of the pipe at the pressure side thereof or in other words what might be termed the cut off side of the pipe thus strengthening the plug against the ice pressure in the cut off pipe.

A still further object of the invention is the provision of a stop cock which is simple in construction, thoroughly reliable, practical and efficient in operation, and one that may be manufactured at a minimum expense.

With these and other objects in view the invention consists in the construction, combination and arrangement of parts as will be hereinafter more fully described, illustrated in the accompanying drawings disclosing the preferred form of embodiment of the invention and pointed out in the claim hereunto appended.

In the drawings:—Figure 1 is a vertical longitudinal sectional view through a stop cock constructed in accordance with the invention. Fig. 2 is a top plan view. Fig. 3 is a horizontal transverse sectional view therethrough. Fig. 4 is a detail perspective view of the rotary or turning plug of the stop cock the same being removed therefrom.

Similar reference characters indicate corresponding parts throughout the several views in the drawings.

Referring to the drawings by numerals 5 designates generally the casing of the stop cock and 6 the plug therein, the same being a truncated cone and having a transverse passage 7 extending through it while the casing 5 has a detachable socket accurately fitting about the plug the socket being intersected by a horizontal bore 8 having its opposite ends opening through internally threaded extensions 9 and 10 the same projecting outwardly from diametrically opposite points of the casing the end portion 9 being adapted to engage with a length of screw threaded pressure pipe 11 while the end portion 10 is engaged with a length of a screw threaded discharge pipe 12, these pipes being of corresponding diameter with similar bores of a size corresponding to the bore 8 in the casing of the stop cock. The passage 7 in the plug 6 is disposed slightly to one side of the axis of rotation of the said plug 6 so as to present a thickened wall 13 which closes the bore of the pressure pipe 11 when the plug has been turned to normal closed position. The inner surface of this passage 7 is covered with an inoxidizable lining or filling 14 preferably consisting of a mixture of lead and tin substance so that injurious solutions passing through the passage 7 will be resisted by said lining or filling 14 and thereby increase the life of the plug because the said lining or filling will protect the plug from said solutions.

At a medial point relative to the passage 7 opposite the thickened wall 13 of the said plug is provided at right angles to the said passage a drain slot or passage 15 the same communicating with the said passage 7 and coextensive with its length so that on closing the plug the drain passage 15 will establish communication between the passage 7 and the discharge pipe 12 thereby permitting the accumulated water within the passage to be drained therefrom into the discharge pipe so as to obviate the possible bursting of the stop cock due to frost or ice formation within the discharge pipe 12 in cold weather.

In the top face of the turning plug 6 at the required point is formed an indicator mark 16 the latter serving to indicate at the proper time when the plug has been turned to close the stop cock. This indicator mark 16 when the plug has been turned to closed position is adapted to register with an indicator mark 17 provided in the top face of the casing 5 whereupon it will be determined that the said plug 6 is in closed position. Also provided in the top face of the plug is a further indicator mark 18 the same being adapted to be on the turning of the plug brought into alinement with the indicator mark 17 thereby determining that the plug is in opened position by having its passage 7 aline or register with the bores of the pipes 11 and 12 thus establishing communication therebetween.

What is claimed is:—

In a stop cock, the combination with a casing having a bore therethrough; of a plug rotatably mounted in the casing, said plug having a transverse passage therethrough disposed to one side of its axial center and greater in height than the diameter of the bore, a one-piece rectangular inoxidizable lining fitted in said passage and having a slot extending vertically therethrough of an extent equal to the diameter of the bore and communicating with a similarly disposed drain slot in the narrow side of the plug at right angles to the passage and coextensive with the longitudinal center thereof, the inner faces of the top and bottom portions of the lining being flush with the upper and lower exposed walls of the slot.

In testimony whereof, I affix my signature, in presence of two witnesses.

HAROLD P. F. HEDGER.

Witnesses:
  M. E. DONOVAN,
  L. ATCHISON.